(12) United States Patent
O'Leary et al.

(10) Patent No.: US 8,210,729 B2
(45) Date of Patent: Jul. 3, 2012

(54) ATTACHMENT SYSTEM FOR LIGHT-CONDUCTING FIBERS

(75) Inventors: Anthony W. O'Leary, Walpole, MA (US); Robert A. Rabiner, Tiverton, RI (US); Dennis P. Colleran, North Attleboro, MA (US); Justin G. Dye, Mansfield, MA (US); Douglas A. Kornbluth, Foxboro, MA (US); Narissa Y. Chang, Mansfield, MA (US); Joshua M. Morin, Newington, CT (US)

(73) Assignee: IlluminOss Medical, Inc., East Providence, RI (US)

( * ) Notice: Subject to any disclaimer, the term of this patent is extended or adjusted under 35 U.S.C. 154(b) by 358 days.

(21) Appl. No.: 12/755,105

(22) Filed: Apr. 6, 2010

(65) Prior Publication Data

US 2010/0265733 A1    Oct. 21, 2010

Related U.S. Application Data

(60) Provisional application No. 61/166,960, filed on Apr. 6, 2009.

(51) Int. Cl.
*A61B 1/00* (2006.01)
(52) U.S. Cl. ........................... 362/555; 362/572
(58) Field of Classification Search .................. 362/555, 362/572, 574, 580, 582
See application file for complete search history.

(56) References Cited

U.S. PATENT DOCUMENTS

| | | | |
|---|---|---|---|
| 4,280,233 A | 7/1981 | Raab | |
| 4,294,251 A | 10/1981 | Greenwald et al. | |
| 4,313,434 A | 2/1982 | Segal | |
| 4,341,691 A | 7/1982 | Anuta | |
| 4,369,772 A | 1/1983 | Miller | |
| 4,414,608 A * | 11/1983 | Furihata | ........................ 362/574 |

(Continued)

FOREIGN PATENT DOCUMENTS

WO   WO 2004/112661    12/2004

(Continued)

OTHER PUBLICATIONS

Jovanovic et al., "Fixion Nails for Humeral Fractures, Injury", Int. J. Care Injured, vol. 35, Issue 11, pp. 1140-1142, Nov. 2004.

(Continued)

*Primary Examiner* — David V Bruce
(74) *Attorney, Agent, or Firm* — Greenberg Traurig, LLP; David J. Dykeman; Danielle T. Abramson

(57) ABSTRACT

In an embodiment, an attachment system for communicating light energy from a light source to a light-conducting fiber includes a light pipe body sufficiently designed to engage a distal end of a light pipe, the light pipe body comprising at least one opening configured to dissipate heat buildup from light energy; a front assembly sufficiently designed to engage the light pipe body, the front assembly comprising an orifice and at least one opening configured to dissipate heat buildup from light energy; a light-conducting fiber body sufficiently designed to engage the front assembly and to hold a proximal portion of a light-conducting fiber, the light-conducting fiber body positioned in the orifice of the front assembly; and an optical taper assembly sufficiently designed to hold an optical taper, the optical taper assembly positioned between and spaced apart from the front assembly, and positioned between and spaced apart from the light pipe.

20 Claims, 3 Drawing Sheets

U.S. PATENT DOCUMENTS

| | | | |
|---|---|---|---|
| 4,422,719 A | 12/1983 | Orcutt | |
| 4,433,898 A | 2/1984 | Nasiri | |
| 4,462,394 A | 7/1984 | Jacobs | |
| 4,466,435 A | 8/1984 | Murray | |
| 4,686,973 A | 8/1987 | Frisch | |
| 4,697,584 A | 10/1987 | Haynes | |
| 4,735,625 A | 4/1988 | Davidson | |
| 4,870,953 A | 10/1989 | DonMichael et al. | |
| 4,888,024 A | 12/1989 | Powlan | |
| 4,904,391 A | 2/1990 | Freeman | |
| 4,961,424 A | 10/1990 | Kubota et al. | |
| 4,963,151 A | 10/1990 | Ducheyne et al. | |
| 4,969,888 A | 11/1990 | Scholten et al. | |
| 5,030,093 A | 7/1991 | Mitnick | |
| 5,049,157 A | 9/1991 | Mittelmeier et al. | |
| 5,092,899 A | 3/1992 | Forte | |
| 5,102,413 A | 4/1992 | Poddar | |
| 5,108,404 A | 4/1992 | Scholten et al. | |
| 5,112,333 A | 5/1992 | Fixel | |
| 5,303,718 A | 4/1994 | Krajicek | |
| 5,316,550 A | 5/1994 | Forte | |
| 5,336,699 A | 8/1994 | Cooke et al. | |
| 5,372,598 A | 12/1994 | Luhr et al. | |
| 5,391,144 A | 2/1995 | Sakurai et al. | |
| 5,423,850 A | 6/1995 | Berger | |
| 5,432,876 A | 7/1995 | Appeldorn et al. | |
| 5,443,468 A | 8/1995 | Johnson | |
| 5,462,552 A | 10/1995 | Kiester | |
| 5,480,400 A | 1/1996 | Berger | |
| 5,548,676 A | 8/1996 | Savage, Jr. | |
| 5,554,111 A | 9/1996 | Morrey et al. | |
| 5,556,429 A | 9/1996 | Felt | |
| 5,658,310 A | 8/1997 | Berger | |
| 5,658,963 A | 8/1997 | Qian et al. | |
| 5,705,181 A | 1/1998 | Cooper et al. | |
| 5,707,374 A | 1/1998 | Schmidt | |
| 5,795,353 A | 8/1998 | Felt | |
| 5,824,087 A | 10/1998 | Aspden et al. | |
| 5,827,289 A | 10/1998 | Reiley et al. | |
| 5,888,220 A | 3/1999 | Felt et al. | |
| 5,897,557 A | 4/1999 | Chin et al. | |
| 5,908,433 A | 6/1999 | Eager et al. | |
| 5,972,015 A | 10/1999 | Scribner et al. | |
| 5,980,075 A | 11/1999 | Sheaffer | |
| 5,980,253 A | 11/1999 | Oxman et al. | |
| 5,987,199 A | 11/1999 | Zarian et al. | |
| 5,989,230 A | 11/1999 | Frassica | |
| 6,019,761 A | 2/2000 | Gustilo | |
| 6,019,774 A | 2/2000 | Weiss et al. | |
| 6,033,411 A | 3/2000 | Preissman | |
| 6,039,762 A | 3/2000 | McKay | |
| 6,042,380 A | 3/2000 | De Rowe | |
| 6,059,789 A | 5/2000 | Dinger et al. | |
| 6,066,154 A | 5/2000 | Reiley et al. | |
| 6,079,868 A | 6/2000 | Rydell | |
| 6,110,176 A | 8/2000 | Shapira | |
| 6,121,341 A | 9/2000 | Sawhney et al. | |
| 6,127,597 A | 10/2000 | Beyar et al. | |
| 6,140,452 A | 10/2000 | Felt et al. | |
| 6,179,852 B1 | 1/2001 | Strickland et al. | |
| 6,195,477 B1 | 2/2001 | Denuto et al. | |
| 6,200,134 B1 | 3/2001 | Kovac et al. | |
| 6,217,581 B1 | 4/2001 | Tolson | |
| 6,224,630 B1 | 5/2001 | Bao et al. | |
| 6,235,043 B1 | 5/2001 | Reiley et al. | |
| 6,241,734 B1 | 6/2001 | Scribner et al. | |
| 6,248,110 B1 | 6/2001 | Reiley et al. | |
| 6,248,131 B1 | 6/2001 | Felt et al. | |
| 6,280,456 B1 | 8/2001 | Scribner et al. | |
| 6,290,382 B1 | 9/2001 | Bourn et al. | |
| 6,299,597 B1 | 10/2001 | Buscemi et al. | |
| 6,306,177 B1 | 10/2001 | Felt et al. | |
| 6,336,914 B1 | 1/2002 | Gillespie, III | |
| 6,336,930 B1 | 1/2002 | Stalcup et al. | |
| 6,358,252 B1 | 3/2002 | Shapira | |
| 6,387,098 B1 | 5/2002 | Cole et al. | |
| 6,395,007 B1 | 5/2002 | Bhatnagar et al. | |
| 6,416,737 B1 | 7/2002 | Manolagas et al. | |
| 6,423,083 B2 | 7/2002 | Reiley et al. | |
| 6,425,923 B1 | 7/2002 | Stalcup et al. | |
| 6,440,444 B2 | 8/2002 | Boyce et al. | |
| 6,443,988 B2 | 9/2002 | Felt et al. | |
| 6,447,514 B1 | 9/2002 | Stalcup et al. | |
| 6,458,375 B1 | 10/2002 | Gertzman et al. | |
| 6,478,751 B1 | 11/2002 | Krueger et al. | |
| 6,485,512 B1 | 11/2002 | Cheng | |
| 6,494,883 B1 | 12/2002 | Ferree | |
| 6,524,251 B2 | 2/2003 | Rabiner et al. | |
| 6,551,337 B1 | 4/2003 | Rabiner et al. | |
| 6,565,528 B1 | 5/2003 | Mueller | |
| 6,579,277 B1 | 6/2003 | Rabiner et al. | |
| 6,579,279 B1 | 6/2003 | Rabiner et al. | |
| 6,620,185 B1 | 9/2003 | Harvie et al. | |
| 6,623,505 B2 | 9/2003 | Scribner et al. | |
| 6,648,881 B2 | 11/2003 | KenKnight et al. | |
| 6,652,547 B2 | 11/2003 | Rabiner et al. | |
| 6,652,587 B2 | 11/2003 | Felt et al. | |
| 6,660,013 B2 | 12/2003 | Rabiner et al. | |
| 6,679,873 B2 | 1/2004 | Rabiner et al. | |
| 6,695,781 B2 | 2/2004 | Rabiner et al. | |
| 6,695,782 B2 | 2/2004 | Ranucci et al. | |
| 6,696,073 B2 | 2/2004 | Boyce et al. | |
| 6,716,216 B1 | 4/2004 | Boucher et al. | |
| 6,719,773 B1 | 4/2004 | Boucher et al. | |
| 6,726,691 B2 | 4/2004 | Osorio et al. | |
| 6,730,048 B1 | 5/2004 | Hare et al. | |
| 6,733,451 B2 | 5/2004 | Rabiner et al. | |
| 6,733,513 B2 | 5/2004 | Boyle et al. | |
| 6,740,093 B2 | 5/2004 | Hochschuler et al. | |
| 6,755,862 B2 | 6/2004 | Keynan | |
| 6,802,835 B2 | 10/2004 | Rabiner et al. | |
| 6,818,018 B1 | 11/2004 | Sawhney | |
| 6,852,095 B1 | 2/2005 | Ray | |
| 6,866,678 B2 | 3/2005 | Shenderova et al. | |
| 6,869,442 B2 | 3/2005 | Cheng | |
| 6,875,212 B2 | 4/2005 | Shaolian et al. | |
| 6,885,246 B2 | 4/2005 | Tsutsui et al. | |
| 6,887,246 B2 | 5/2005 | Bhatnagar et al. | |
| 6,887,275 B2 | 5/2005 | Carchidi et al. | |
| 6,899,713 B2 | 5/2005 | Shaolian et al. | |
| 6,899,719 B2 | 5/2005 | Reiley et al. | |
| 6,932,843 B2 | 8/2005 | Smith et al. | |
| 6,964,667 B2 | 11/2005 | Shaolian et al. | |
| 6,979,341 B2 | 12/2005 | Scribner et al. | |
| 6,981,981 B2 | 1/2006 | Reiley et al. | |
| 7,001,431 B2 | 2/2006 | Bao et al. | |
| 7,008,433 B2 | 3/2006 | Voellmicke et al. | |
| 7,052,498 B2 | 5/2006 | Levy et al. | |
| 7,077,865 B2 | 7/2006 | Bao et al. | |
| 7,124,067 B2 | 10/2006 | Ascenzi | |
| 7,141,061 B2 | 11/2006 | Williams et al. | |
| 7,144,414 B2 | 12/2006 | Harvie et al. | |
| 7,153,305 B2 | 12/2006 | Johnson et al. | |
| 7,156,861 B2 | 1/2007 | Scribner et al. | |
| 7,156,880 B2 | 1/2007 | Evans et al. | |
| 7,215,863 B1 | 5/2007 | Arenella et al. | |
| 7,241,303 B2 | 7/2007 | Reiss et al. | |
| 7,258,692 B2 | 8/2007 | Thelen et al. | |
| 7,261,720 B2 | 8/2007 | Stevens et al. | |
| 7,320,709 B2 | 1/2008 | Felt et al. | |
| 7,341,601 B2 | 3/2008 | Eisermann et al. | |
| 7,360,542 B2 | 4/2008 | Nelson et al. | |
| 7,407,616 B2 | 8/2008 | Melikechi et al. | |
| 7,419,450 B2 * | 9/2008 | Ito | 362/574 |
| 7,427,295 B2 | 9/2008 | Ellman et al. | |
| 7,547,319 B2 | 6/2009 | Segal et al. | |
| 7,628,800 B2 | 12/2009 | Sherman et al. | |
| 7,632,291 B2 | 12/2009 | Stephens et al. | |
| 7,666,205 B2 | 2/2010 | Weikel et al. | |
| 7,722,620 B2 | 5/2010 | Truckai et al. | |
| 7,766,965 B2 | 8/2010 | Bao et al. | |
| 7,771,476 B2 | 8/2010 | Justis et al. | |
| 7,806,900 B2 | 10/2010 | Rabiner | |
| 7,811,284 B2 | 10/2010 | Rabiner | |
| 7,811,290 B2 | 10/2010 | Rabiner | |
| 7,842,040 B2 | 11/2010 | Rabiner et al. | |
| 7,879,041 B2 | 2/2011 | Rabiner et al. | |

| | | |
|---|---|---|
| 7,912,539 B2 | 3/2011 | Doty et al. |
| 7,947,015 B2 | 5/2011 | Herweck et al. |
| 8,034,071 B2 | 10/2011 | Scribner et al. |
| 2001/0011174 A1 | 8/2001 | Reiley et al. |
| 2001/0044626 A1 | 11/2001 | Reiley et al. |
| 2002/0156482 A1 | 10/2002 | Scribner et al. |
| 2002/0198526 A1 | 12/2002 | Shaolian et al. |
| 2003/0028210 A1 | 2/2003 | Boyle et al. |
| 2003/0105469 A1 | 6/2003 | Karmon |
| 2003/0114914 A1 | 6/2003 | Cheng |
| 2003/0156431 A1* | 8/2003 | Gozum et al. ............... 362/582 |
| 2003/0199850 A1 | 10/2003 | Chavez et al. |
| 2003/0229372 A1 | 12/2003 | Reiley et al. |
| 2004/0006341 A1 | 1/2004 | Shaolian et al. |
| 2004/0034434 A1 | 2/2004 | Evans et al. |
| 2004/0059333 A1 | 3/2004 | Carl et al. |
| 2004/0059417 A1 | 3/2004 | Smith et al. |
| 2004/0092948 A1 | 5/2004 | Stevens et al. |
| 2004/0098015 A1 | 5/2004 | Weikel et al. |
| 2004/0117025 A1 | 6/2004 | Reindel |
| 2004/0133280 A1 | 7/2004 | Trieu |
| 2004/0167625 A1 | 8/2004 | Beyar et al. |
| 2004/0225296 A1 | 11/2004 | Reiss et al. |
| 2004/0228142 A1* | 11/2004 | Takada et al. ............... 362/555 |
| 2004/0230309 A1 | 11/2004 | Di Mauro et al. |
| 2004/0247641 A1 | 12/2004 | Felt et al. |
| 2005/0010231 A1 | 1/2005 | Myers |
| 2005/0043733 A1 | 2/2005 | Eisermann et al. |
| 2005/0043808 A1 | 2/2005 | Felt et al. |
| 2005/0119662 A1 | 6/2005 | Reiley et al. |
| 2005/0142315 A1 | 6/2005 | DeSimone et al. |
| 2005/0149022 A1 | 7/2005 | Shaolian et al. |
| 2005/0159749 A1 | 7/2005 | Levy et al. |
| 2005/0234453 A1 | 10/2005 | Shaolian et al. |
| 2005/0251140 A1 | 11/2005 | Shaolian et al. |
| 2005/0284485 A9 | 12/2005 | Nelson et al. |
| 2006/0009550 A1 | 1/2006 | Messersmith et al. |
| 2006/0036253 A1 | 2/2006 | Leroux et al. |
| 2006/0100547 A1 | 5/2006 | Rabiner et al. |
| 2006/0100635 A1 | 5/2006 | Reiley et al. |
| 2006/0100706 A1 | 5/2006 | Shadduck et al. |
| 2006/0111726 A1 | 5/2006 | Felt et al. |
| 2006/0122625 A1 | 6/2006 | Truckai et al. |
| 2006/0155296 A1 | 7/2006 | Richter |
| 2006/0173464 A1 | 8/2006 | Ellman et al. |
| 2006/0183811 A1 | 8/2006 | Melikechi et al. |
| 2006/0184246 A1 | 8/2006 | Zwirkoski |
| 2006/0195165 A1 | 8/2006 | Gertner et al. |
| 2006/0217747 A1 | 9/2006 | Ferree |
| 2006/0229617 A1 | 10/2006 | Meller et al. |
| 2006/0247787 A1 | 11/2006 | Rydell et al. |
| 2006/0253102 A1 | 11/2006 | Nance et al. |
| 2006/0253200 A1 | 11/2006 | Bao et al. |
| 2006/0258981 A1 | 11/2006 | Eidenschink |
| 2006/0264950 A1 | 11/2006 | Nelson et al. |
| 2006/0264951 A1 | 11/2006 | Nelson et al. |
| 2006/0264952 A1 | 11/2006 | Nelson et al. |
| 2006/0265077 A1 | 11/2006 | Zwirkoski |
| 2006/0271061 A1 | 11/2006 | Beyar et al. |
| 2006/0276793 A1 | 12/2006 | Berry |
| 2006/0276819 A1 | 12/2006 | Osorio et al. |
| 2006/0282169 A1 | 12/2006 | Felt et al. |
| 2006/0287730 A1 | 12/2006 | Segal et al. |
| 2007/0027547 A1 | 2/2007 | Rydell et al. |
| 2007/0067032 A1 | 3/2007 | Felt et al. |
| 2007/0087031 A1 | 4/2007 | Ashman et al. |
| 2007/0118143 A1 | 5/2007 | Ralph et al. |
| 2007/0123877 A1 | 5/2007 | Goldin et al. |
| 2007/0161991 A1 | 7/2007 | Altarac et al. |
| 2007/0198023 A1 | 8/2007 | Sand et al. |
| 2007/0225705 A1 | 9/2007 | Osario et al. |
| 2007/0255287 A1 | 11/2007 | Rabiner |
| 2008/0015500 A1 | 1/2008 | Herweck et al. |
| 2008/0039854 A1 | 2/2008 | Rabiner |
| 2008/0080205 A1 | 4/2008 | Forrester et al. |
| 2008/0103505 A1 | 5/2008 | Fransen |
| 2008/0125784 A1 | 5/2008 | Rabiner et al. |
| 2008/0188858 A1 | 8/2008 | Luzzi et al. |
| 2008/0234820 A1 | 9/2008 | Felt et al. |
| 2008/0269750 A1 | 10/2008 | Justin |
| 2009/0018524 A1 | 1/2009 | Greenhalgh et al. |
| 2009/0048629 A1 | 2/2009 | Rabiner |
| 2009/0054900 A1 | 2/2009 | Rabiner et al. |
| 2009/0112196 A1 | 4/2009 | Rabiner et al. |
| 2009/0171265 A1 | 7/2009 | Doty et al. |
| 2009/0171358 A1 | 7/2009 | Chang et al. |
| 2009/0177204 A1 | 7/2009 | Colleran et al. |
| 2009/0187192 A1 | 7/2009 | Rabiner et al. |
| 2009/0216232 A1 | 8/2009 | Buford, III et al. |
| 2010/0256641 A1 | 10/2010 | Rabiner et al. |
| 2010/0262069 A1 | 10/2010 | Rabiner et al. |
| 2010/0262188 A1 | 10/2010 | Rabiner et al. |
| 2010/0265733 A1 | 10/2010 | O'Leary et al. |
| 2010/0318087 A1 | 12/2010 | Scribner et al. |
| 2010/0331850 A1 | 12/2010 | Rabiner |
| 2011/0004213 A1 | 1/2011 | Rabiner et al. |
| 2011/0009871 A1 | 1/2011 | Rabiner |
| 2011/0046746 A1 | 2/2011 | Rabiner et al. |
| 2011/0098713 A1 | 4/2011 | Rabiner et al. |
| 2011/0110114 A1* | 5/2011 | Papac et al. ............... 362/555 |
| 2011/0118740 A1 | 5/2011 | Rabiner et al. |
| 2011/0166306 A1 | 7/2011 | Stansbury et al. |
| 2011/0313356 A1 | 12/2011 | Rabiner et al. |

FOREIGN PATENT DOCUMENTS

| | | |
|---|---|---|
| WO | WO 2005/112804 | 12/2005 |
| WO | WO 2006/016807 | 2/2006 |
| WO | WO 2007/127255 | 11/2007 |
| WO | WO 2007/127260 | 11/2007 |
| WO | WO 2008/063265 | 5/2008 |
| WO | WO 2009/059090 | 5/2009 |
| WO | WO 2009/082688 | 7/2009 |
| WO | WO 2009/131999 | 10/2009 |
| WO | WO 2010/050965 | 5/2010 |
| WO | WO 2010/118158 | 10/2010 |
| WO | WO 2011/060062 | 5/2011 |
| WO | WO 2011/071567 | 6/2011 |
| WO | WO 2011/162910 | 12/2011 |

OTHER PUBLICATIONS

Maruyama et al., "Metacarpal Fracture Fixation with Absorbable Polyglycolide Rods and Stainless Steel K Wires: A Biomechanical Comparison", Journal of Biomedical Materials Research (Applied Biomaterials), vol. 33, Issue 1, pp. 9-12, Apr. 1996.

Waris et al., "Bioabsorbable Miniplating Versus Metallic Fixation for Metacarpal Fractures", Clinical Orthopaedics and Related Research, No. 410, pp. 310-319, May 2003.

Waris et al., "Self-Reinforced Bioabsorbable Versus Metallic Fixation Systems for Metacarpal and Phalangeal Fractures: A Biomechanical Study", The Journal of Hand Surgery, vol. 27A, No. 5, pp. 902-909, Sep. 2002.

International Search Report based on PCT/US07/20402 dated Apr. 1, 2008.

International Search Report based on PCT/US07/10050 dated Apr. 17, 2008.

International Search Report based on PCT/US07/10038 dated Aug. 27, 2008.

International Search Report based on PCT/US08/81929 dated Jan. 12, 2009.

International Search Report based on PCT/US08/81924 dated Feb. 9, 2009.

International Search Report based on PCT/US08/87630 dated Feb. 24, 2009.

International Search Report based on PCT/US10/30275 dated Aug. 11, 2010.

Office Action in U.S. Appl. No. 11/789,906 mailed Apr. 29, 2009.
Office Action in U.S. Appl. No. 11/789,906 mailed Mar. 11, 2010.
Office Action in U.S. Appl. No. 11/789,906 mailed Apr. 30, 2010.
Office Action in U.S. Appl. No. 11/789,907 mailed May 11, 2010.
Office Action in U.S. Appl. No. 11/903,123 mailed Jul. 1, 2010.
Office Action in U.S. Appl. No. 12/262,411 mailed Sep. 1, 2010.
PCT International Search Report based on PCT/US11/38389 dated Sep. 22, 2011.

USPTO Office Action in U.S. Appl. No. 11/964,370 mailed Sep. 23, 2011.
USPTO Office Action in U.S. Appl. No. 12/858,924 mailed Oct. 24, 2011.
USPTO Office Action in U.S. Appl. No. 12/755,784 mailed Dec. 23, 2011.
USPTO Office Action in U.S. Appl. No. 12/886,288 mailed Dec. 27, 2011.
Office Action in U.S. Appl. No. 11/964,370 mailed Dec. 9, 2010.
International Search Report based on PCT/US10/56219 dated Jan. 20, 2011.
International Search Report based on PCT/US10/46003 dated May 24, 2011.
Final Office Action in U.S. Appl. No. 11/964,370 mailed Apr. 28, 2011.

* cited by examiner

ATTACHMENT SYSTEM FOR LIGHT-CONDUCTING FIBERS

RELATED APPLICATIONS

This application claims the benefit of and priority to U.S. Provisional Patent Application No. 61/166,960, filed on Apr. 6, 2009, the entirety of this application is hereby incorporated herein by reference.

FIELD

The presently disclosed embodiments relate to an attachment system for communicating light energy from a light source to a light-conducting fiber, and more particularly to an attachment system sufficiently designed to maintain the light transmitting properties of the light-conducting fiber.

BACKGROUND

Light sources are used in medical procedures for a variety of purposes including illuminating dark or poorly lit regions, heating, burning, ablating and/or destroying tissue, organs, vessels or other body structures, curing materials, such as glues or epoxies, and a variety of other uses. Different frequencies, bandwidths or colors of light are oftentimes used for different medical applications. For example, white light may be used for general screening of a patient and blue or ultra violet light may be used to cure certain glues or epoxies.

A light pipe can transmit output energy of the light source into highly uniform illumination. Sufficient energy is needed for a desired illumination however, sometimes the intensity of the energy can destroy the optical properties of the light pipe. This can happen, for example, by excess heat melting the interface between the light pipe and the light source, especially when the light pipe is a plastic optical fiber.

SUMMARY

An attachment system for communicating light energy from a light source to a light-conducting fiber is disclosed herein. According to the aspects illustrated herein, an attachment system includes a light pipe body sufficiently designed to engage a distal end of a light pipe, the light pipe body comprising at least one opening configured to dissipate heat buildup from light energy; a front assembly sufficiently designed to engage the light pipe body, the front assembly comprising an orifice and at least one opening configured to dissipate heat buildup from light energy; a light-conducting fiber body sufficiently designed to engage the front assembly and to hold a proximal portion of a light-conducting fiber, the light-conducting fiber body positioned in the orifice of the front assembly; and an optical taper assembly sufficiently designed to hold an optical taper, the optical taper assembly positioned between and spaced apart from the front assembly, and positioned between and spaced apart from the light pipe.

According to the aspects illustrated herein, there is provided a device that includes a first portion having a cavity for carrying a light pipe, the light pipe transmitting light energy from a light source; an optical taper assembly having an optical taper sufficiently designed to alter at least one property of the light energy; and a second portion having a cavity for carrying an optical fiber, the optical fiber receiving the altered light energy from the optical taper; wherein the optical taper is configured to be spaced apart from a distal end of the light pipe, and wherein the optical taper is configured to be spaced apart from a proximal end of the optical fiber, when the light pipe and the optical fiber are positioned in the device.

According to the aspects illustrated herein, there is provided a method of transmitting light energy to a remote location that includes providing a light source having a light pipe; providing an attachment system that includes a light pipe body sufficiently designed to engage a distal end of the light pipe, the light pipe body comprising at least one opening configured to dissipate heat buildup from the light energy; a front assembly sufficiently designed to engage the light pipe body, the front assembly including an orifice and at least one opening configured to dissipate heat buildup from the light energy; a light-conducting fiber body sufficiently designed to engage the front assembly and to hold a proximal portion of a light-conducting fiber, the light-conducting fiber body positioned in the orifice of the front assembly; and an optical taper assembly sufficiently designed to hold an optical taper, the optical taper assembly positioned between and spaced apart from the front assembly, and positioned between and spaced apart from the light pipe; engaging the light pipe to the light pipe body; engaging the light-conducting fiber to the light-conducting fiber body; activating a power source to energize the light source to produce the light energy; and transmitting the light energy from the light source through the attachment system to the remote location.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The presently disclosed embodiments relate to an attachment system for communicating light energy from a light source to a light-conducting fiber. The attachment system of the present disclosure is sufficiently designed to maintain the light transmitting properties of the light-conducting fiber. In an embodiment, the attachment system of the present disclosure is sufficiently designed to prevent melting of at least a portion of a light-conducting fiber. In an embodiment, the attachment system of the present disclosure is sufficiently designed to prevent shrinking of at least a portion of a light-conducting fiber. In an embodiment, the attachment system of the present disclosure is sufficiently designed to prevent deterioration of at least a portion of a light-conducting fiber.

Figure 1:
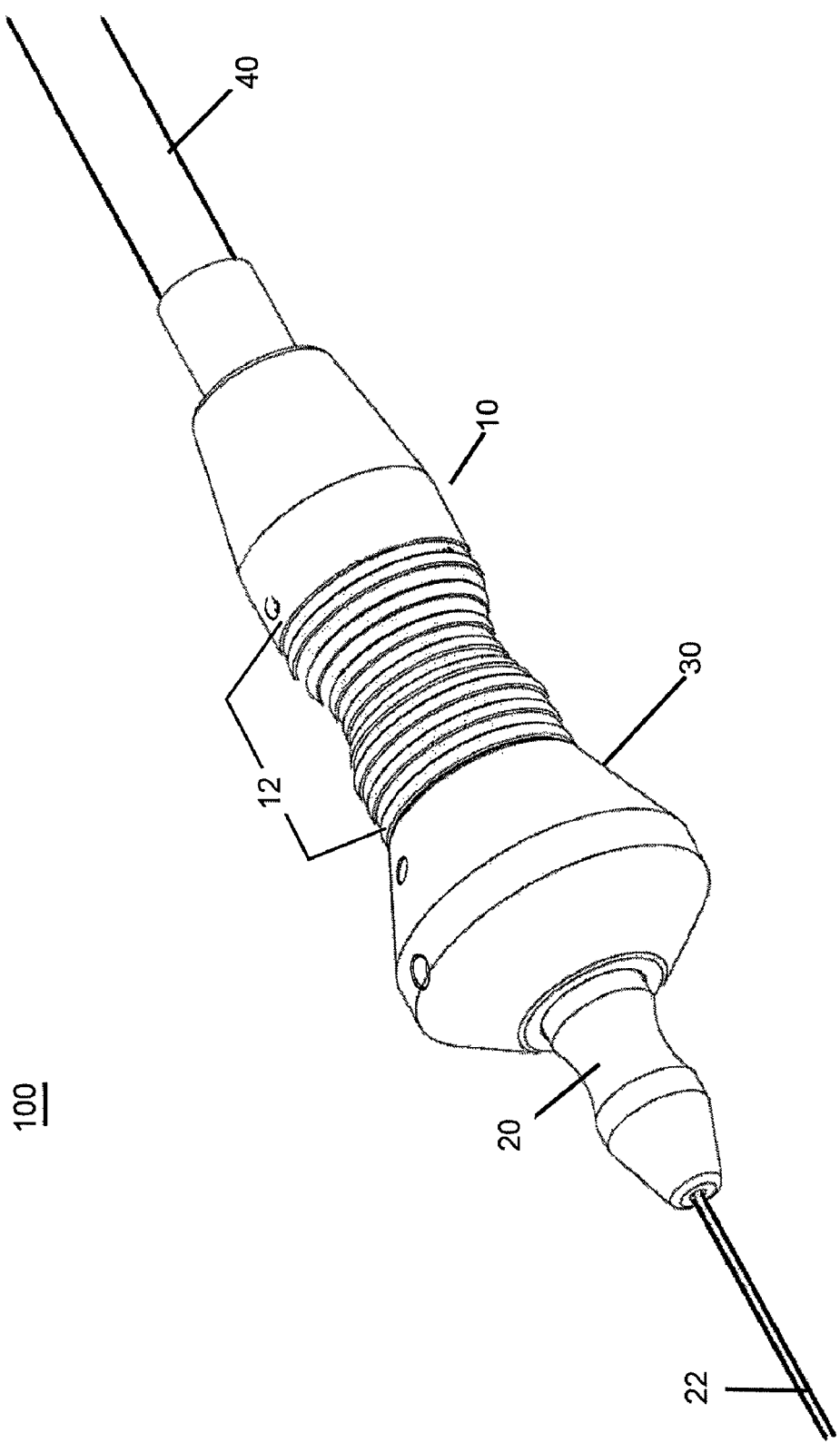
FIG. 1 shows a perspective view of an embodiment of an attachment system of the present disclosure. The attachment system communicates light energy from a light source to a light-conducting fiber.
Figure 2:
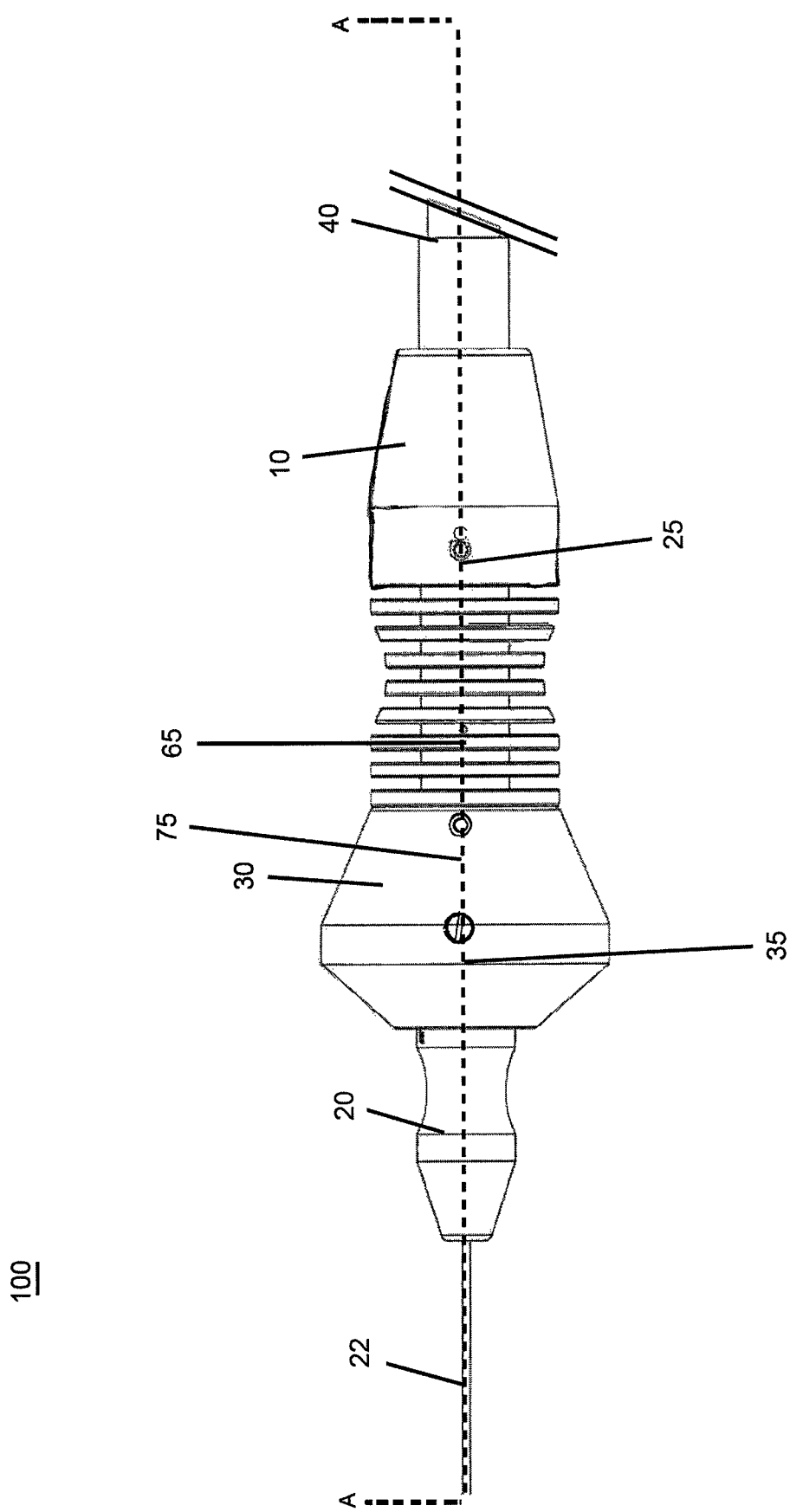
FIG. 2 shows a side view of the attachment system of FIG. 1.

FIG. 1 in conjunction with FIG. 2 shows an embodiment of an attachment system 100 of the present disclosure. In an embodiment, the attachment system 100 is used to communicate light energy from a light source (not visible) to a light-conducting fiber 22. The attachment system 100 includes a front assembly 30; a light-conducting fiber body 20 engaging the front assembly 30 and sufficiently designed to hold a proximal portion of the light-conducting fiber 22; an optical taper assembly 50 (illustrated in FIG. 3) having an optical taper 58; and a light pipe body 10 engaging the front assembly 30 and sufficiently designed to hold a distal end of a light pipe 40 transmitting output energy from a light source. In an embodiment, a cavity in the light pipe body 10 holds the light pipe 40. In an embodiment, the light pipe body 10 is referred to as the "first portion" of the attachment system 100. In an embodiment, the front assembly 30 and the light-conducting fiber body 20 are fabricated as two separate components. In an embodiment, the front assembly 30 has an orifice for holding a portion of the light-conducting fiber body 20. In an embodiment, the front assembly 30 and the light-conducting fiber body 20 are fabricated as one component. In an embodiment, the front assembly 30 and the light-conducting fiber body 20 together are referred to as the "second portion" of the attachment system 100. In an embodiment, the light pipe body 10 and the front assembly 30 are made from a metal material. In an embodiment, the light pipe body 10 and the front assembly 30 are made from an aluminum material, such as anodized aluminum. In an embodiment, a portion of the light pipe body 10 is designed with a series of fins 12. In an embodiment, the high thermal conductivity of the metal material of the light pipe body 10 combined with the large surface area of the fins 12 results in the rapid transfer of thermal energy (heat) to the surroundings. In an embodiment, the fins 12 can provide more surface area to dissipate heat than a solid body. In an embodiment, the front assembly 30 and the light pipe body 10 together form a heatsink assembly, absorbing and dissipating heat. In an embodiment, the front assembly 30 engages the light pipe body 10 and the light-conducting fiber body 20, as most clearly illustrated in the side sectional view of FIG. 2.

In an embodiment, the light pipe 40 is an elongated structure having a proximal end, a distal end, and a pathway therebetween. In an embodiment, the light pipe 40 is an elongated tubular structure. In an embodiment, the light pipe 40 is a triangular, square, pentagonal, or any other shaped structure. In an embodiment, the light pipe 40 is made from any material capable for transmitting light energy from a light source. In an embodiment, the light pipe 40 can have any size diameter desired. In an embodiment, the distal end of the light pipe 40 is designed to be positioned within the cavity of the light pipe body 10. In an embodiment, the cavity is sufficiently large in size and shaped in such a manner to permit the distal end of the light pipe 40 to be inserted into and secured within the cavity. In an embodiment, a set screw 25 connects the light pipe body 10 with the light pipe 40 and secures the light pipe 40 within the light pipe body 10.

The light pipe body 10 is an elongated structure extending from the light pipe 40, at its proximal end, to the front assembly 30, at its distal end. In an embodiment, the light pipe body 10 is an elongated tubular structure. In an embodiment, the light pipe body 10 has a triangular, square, pentagonal, or any other shaped structure. In an embodiment, the light pipe body 10 is made from any material capable of functioning as a heat sink to dissipate energy away from the attachment system 100. In an embodiment, the light pipe body 10 can have any size diameter. In an embodiment, the diameter of the light pipe body 10 can vary along its length.

Figure 3:
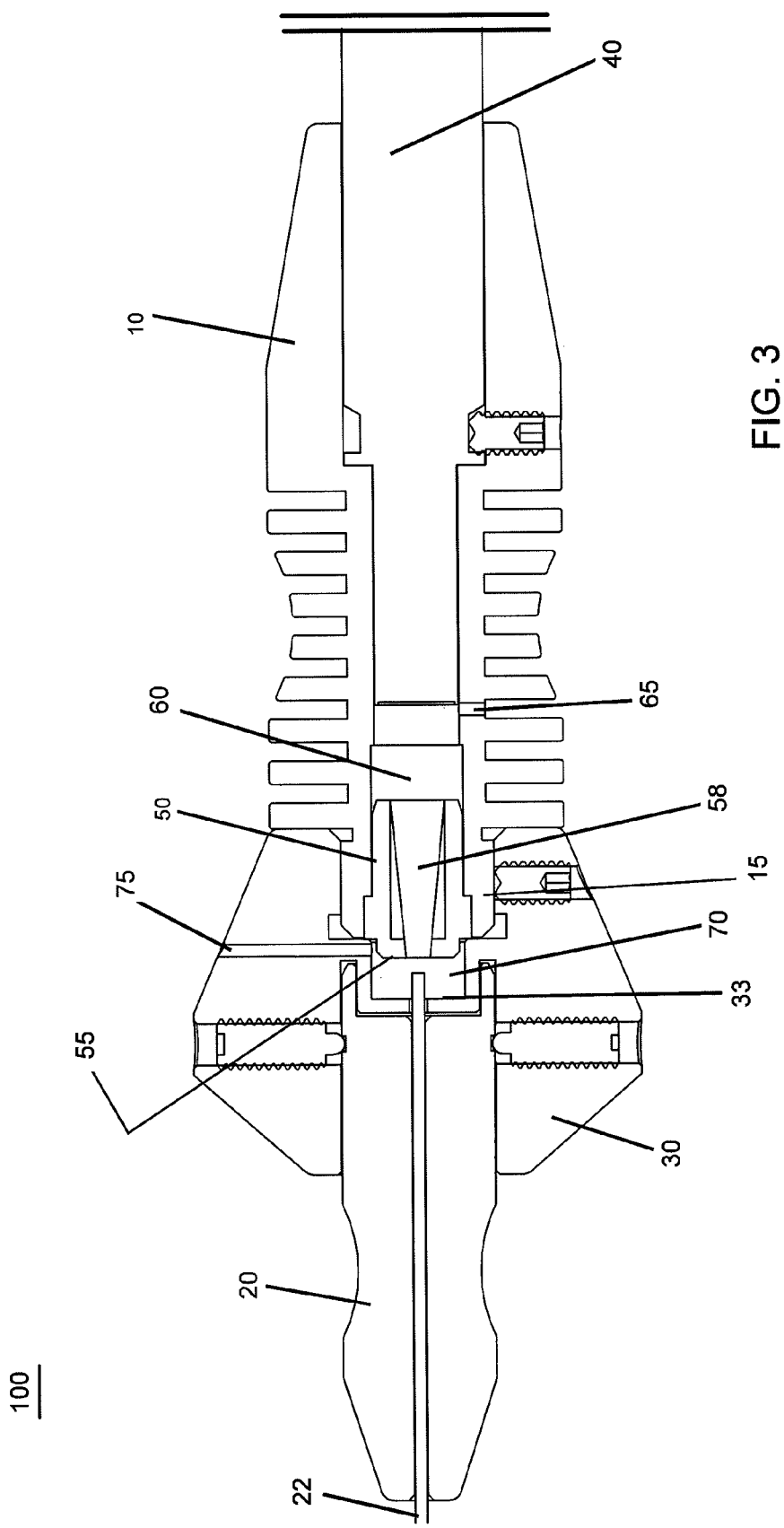
FIG. 3 shows a side sectional view of the attachment system of FIG. 2 taken along line A-A.

In an embodiment, the light pipe body 10 includes a plurality of fins 12 at its distal end. In an embodiment, the plurality of fins 12 are designed to aid in the transfer of thermal energy (heat) to the surroundings. In an embodiment, the plurality of fins 12 are designed to conduct heat away from the light pipe 40. In an embodiment, the plurality of fins 12 extend away from the light pipe body 10. In an embodiment, the plurality of fins 12 include a plurality of rings along its surface. In an embodiment, the plurality of fins 12 are adjacent to one another. In an embodiment, the plurality of fins 12 are spaced apart from one another. In an embodiment, the plurality of fins 12 are continuous about the light pipe body 10. In an embodiment, the plurality of fins 12 are discontinuous about the light pipe body 10. In an embodiment, each of the fins 12 is aligned parallel to an adjacent fin 12. In an embodiment, each of the fins 12 is aligned horizontal to an adjacent fin 12. As illustrated in FIG. 3, the plurality of fins 12 include eight rings. It should be appreciated, however, that the plurality of fins 12 may include more or less rings as the present invention is not intended to be limited in this manner. In an embodiment, the plurality of fins 12 form a rolling structure or a counter shape with a middle section being smaller in diameter than the outer sections. In an embodiment, the first, second, and third fins from the distal end are substantially similar in diameter. In an embodiment, the diameter of the fins decreases with the fourth fin, reaches its smallest diameter with the fifth and sixth fins, and increases with the seventh and eighth fins. In an embodiment, the eighth fin is substantially similar in diameter to the first, second, and third fins. Those skilled in the art will appreciated that a variety of diameters and number of fins 12 is within the spirit and scope of the presently disclosed embodiments.

In an embodiment, the light pipe body 10 engages the front assembly 30 at its distal end. In an embodiment, the front assembly 30 is circular or tubular in shape and includes a proximal end engaging the light pipe body 10, a distal end engaging the light-conducting fiber body 20, and a middle portion. In an embodiment, the diameter of the middle portion of the front assembly 30 is larger than either the proximal end or the distal end of the front assembly 30. In an embodiment, the diameter of the front assembly 30 at the middle portion is larger that the diameter of the light pipe body 10. At the distal end, the front assembly 30 includes an orifice for holding a portion of the light-conducting fiber body 20. In an embodiment, the orifice is sufficiently large in size and shaped in such a manner to permit the distal end of the light-conducting fiber body 20 to be inserted into and secured within the orifice. In an embodiment when the front assembly 30 and the light-conducting fiber body 20 are fabricated as two separate components, a ball plunger 35 connects the front assembly 30 with the light-conducting fiber body 20.

In an embodiment, the light-conducting fiber body 20 is an elongated tubular structure. In an embodiment, the light-conducting fiber body 20 has a triangular, square, pentagonal, or any other shaped structure. In an embodiment, the light-conducting fiber body 20 is made from any material capable of allowing the light-conducting fiber body 20 to function as a heat sink to dissipate energy away from the attachment system 100. In an embodiment, the light-conducting fiber body 20 is made from a polyphenylsulfone (PPSF or PPSU) material (such as Radel®). In an embodiment, the light-conducting fiber body 20 can have any size diameter. In an embodiment, the diameter of the light-conducting fiber body 20 can vary along its length. In an embodiment, the light-conducting fiber body 20 is smaller in diameter than the front assembly 30 and the light pipe body 10. In an embodiment, the light-conducting fiber body 20 is sufficiently designed to hold a proximal portion of the light-conducting fiber 22 at its distal end.

As illustrated most clearly in the side sectional view of FIG. 3, the attachment system 100 may include an optical taper assembly 50 having an optical taper 58. In an embodiment, the optical taper 58 is positioned between a distal end of the light pipe 40 and a middle interface 33 of the front assembly 30. In an embodiment, the optical taper 58 may "float" between the distal end of the light pipe 40 and the middle interface 33 of the front assembly 30. As used herein, "float" or "floating" refers to the optical taper 58 being completely or partially suspended within the optical taper assembly 50. In an embodiment, the optical taper 58 may be connected to the walls of the optical taper assembly 50.

In an embodiment, the optical taper 58 is designed to further focus the output light from the light source, for example, by taking a larger diameter of light and forcing the light down into a smaller diameter to produce a more focused beam of light that is directed to the light-conducting fiber 22. Light emitted from some light sources, such as some light-emitting diodes (LEDs), may be domed. Light that is "domed" refers to light having a domed-shaped cover allowing the light to spread or diverge from a central path. In such instances, it may be desirable to redirect the non-central light from a domed LED light source into a central path. In some embodiments, such as those with optical fibers having a smaller diameter, the light director may be more necessary than those with optical fibers having a larger diameter. In some embodiments, an optical taper having a reflective wall assists in directing non-central light into a central path. By having an inward tilt on a mirrored or reflective surface, the light hitting the tapered distance may be shortened, allowing more light to hit the center of the taper. In some embodiments, the optical taper 58 may have a conical frustum shape (a cone with the top sliced off to create a second face parallel to the base).

The design of the present disclosure may be beneficial when parts of the attachment system 100 heat and expand, potentially resulting in undesirable effects to the optical properties of the light-conducting fiber 22, which may occur when the light-conducting fiber 22 becomes heated beyond the preferred temperature of a given light conducting fiber 22. Potentially undesirable effects include, but are not limited to, melting, shrinkage, deterioration, or distortion of the light-conducting fiber 22, causing a loss of light transmission. Potential causes of the undesirable effects may include, but are not limited to, increases in heat, temperature, energy, or pressure. Other potential causes may include a reduction in air or oxygen.

To minimize or reduce the effects of heat, temperature, energy, pressure buildup, and/or movement of gases on the components of the attachment system 100, the attachment system 100 can be provided with relief areas or openings. In an embodiment, the openings are sufficiently designed to decrease heat, temperature, energy and/or pressure buildup. In an embodiment, the openings are sufficiently designed to move gases away from the attachment system 100. The openings are sufficiently designed so that, upon reducing pressure buildup and/or dissipating heat, temperature, energy, or gas, the light transmitting properties of the light-conducting fiber 22 can be sufficiently maintained as light is being transmitted through the attachment system 100. In other words, the light transmitting properties of the light-conducting fiber 22 will remain substantially the same as light is being transmitted through the attachment system 100. In an embodiment, light transmitting properties may include, but are not limited to, intensity, frequency, polarization, phase or any other properties.

To dissipate pressure buildup and/or transfer heat, temperature or energy away from the attachment system 100, the openings may be designed in several different ways. In an embodiment, the openings may be holes, spaces, cavities, vents or other openings in the attachment system 100 that provide a mechanism for pressure, heat, temperature, and/or energy to escape or exit. In an embodiment, the openings in the attachment system 100 provide a mechanism for directing gases into or away from the attachment system 100. In an embodiment, the openings function as a buffer or filter to block heat or energy while permitting light to transmit through the attachment system 100 or through the optical taper assembly 50. In an embodiment, the openings function as a pathway for conducting or dissipating heat, temperature or energy away from the attachment system 100 or the optical taper assembly 50.

In an embodiment, there may be one, two, three, four or more openings, as the present disclosure is not intended to be limited in this manner. In an embodiment, the openings may be the same throughout the attachment system 100 (i.e., hole, hole, hole) or they may vary (i.e., hole, cavity, vent). In an embodiment, the openings may be of any size or geometric shape desired so long as they function in accordance with the present disclosure.

In an embodiment, the openings may be positioned anywhere along and throughout the attachment system 100. In an embodiment, all of the openings are positioned proximal to the optical taper assembly 50 so that heat, temperature, energy, pressure, and/or gas movement can be controlled prior to the light entering the optical taper assembly 50. In an embodiment, all of the openings are positioned distal to the optical taper assembly 50 so that heat, temperature, energy, pressure and/or gas movement can be controlled prior to the light entering the light-conducting fiber 22. In an embodiment, the openings are positioned both proximally and distally from the optical taper assembly 50. In an embodiment, the openings may be positioned about the optical taper assembly 50. In an embodiment, the openings may be positioned about the light-conducting fiber 22.

In an embodiment, a space 60 and a vent hole 65 between a distal end of the light pipe 40 and a proximal end of the optical taper assembly 50 removes pressure buildup (e.g., provides a relief in pressure) and transfers heat away from a body of a patient during use, thus minimizing thermal build up. In an embodiment, a cavity 70 and a vent hole 75 between a distal end 55 of the optical taper assembly 50 and the middle interface 33 of the front assembly 30 reduces pressure buildup (e.g., provides a relief in pressure) and dissipates heat, thus minimizing thermal build up. In an embodiment, the front assembly 30 absorbs and removes heat generated by the optical taper assembly 50 away from the attachment system 100 and acts as a heat sink for the light-conducting fiber body 20. The space 60 and the vent hole 65 allow sufficient energy down to the optical taper assembly 50 without damage to the optical taper assembly 50. The cavity 70 and the vent hole 75 allows sufficient energy down to the light-conducting fiber 22 without melting of the light-conducting fiber 22. In an embodiment, a relationship exists between the volume of air surrounding the light-conducting fiber 22 and the volume of material creating the cavity 70. This controls overall dimensions of the parts surrounding the light-conducting fiber 22.

In an embodiment, the middle interface 33 of the front assembly 30 is constructed to include a reflective polished surface for reflecting any light remaining in the cavity 70 back towards the light source. In an embodiment, if the volume of air surrounding the light-conducting fiber 22 in the cavity 70 is too small, the temperature may elevate quickly and can melt the reflective polished surface of the middle interface 33 resulting in loss of light transmission. In an embodiment, the reflective polished surface may be a mirror or another reflecting material, such as a metal, glass, mylars, or any other material capable of reflecting light back towards the light source. The reflective polished surface may reflect a specific wavelength of light, a range of wavelengths of light or all wavelengths of light, as not all embodiments are designed to be limiting in this respect. In some embodiments, the reflective polished surface may be located at the middle interface 33 of the front assembly 30. In some embodiments, the middle interface 33 may be made entirely of the reflective polished surface while in some embodiments the reflective polished surface may constitute a portion of the middle interface 33, as not all embodiments are intended to be limited in this respect.

In an embodiment, the light-conducting fiber 22 is an optical fiber. Optical fibers may be used in accordance with the present disclosure to communicate light from the light source to the remote location. Optical fibers use a construction of concentric layers for optical and mechanical advantages. The most basic function of a fiber is to guide light, i.e., to keep light concentrated over longer propagation distances—despite the natural tendency of light beams to diverge, and possibly even under conditions of strong bending. In the simple case of a step-index fiber, this guidance is achieved by creating a region with increased refractive index around the fiber axis, called the fiber core, which is surrounded by the cladding. The cladding is usually protected with at least a polymer coating. Light is kept in the "core" of the optical fiber by total internal reflection. Cladding keeps light traveling down the length of the fiber to a destination. In some instances, it is desirable to conduct electromagnetic waves along a single guide and extract light along a given length of the guide's distal end rather than only at the guide's terminating face. In some embodiments of the present disclosure, at least a portion of a length of an optical fiber is modified, e.g., by removing the cladding, in order to alter the direction, propagation, amount, intensity, angle of incidence, uniformity and/or distribution of light.

The optical fiber can be made from any material, such as glass, silicon, silica glass, quartz, sapphire, plastic, combinations of materials, or any other material, and may have any diameter, as not all embodiments of the present disclosure are intended to be limited in this respect. In an embodiment, the optical fiber is made from a polymethyl methacrylate core with a transparent polymer cladding. The optical fiber can have a diameter between approximately 0.75 mm and approximately 2.0 mm. In some embodiments, the optical fiber can have a diameter of about 0.75 mm, about 1 mm, about 1.5 mm, about 2 mm, less than about 0.75 mm or greater than about 2 mm as not all embodiments of the present disclosure are intended to be limited in this respect. In an embodiment, the optical fiber is made from a polymethyl methacrylate core with a transparent polymer cladding. It should be appreciated that the above-described characteristics and properties of the optical fibers are exemplary and not all embodiments of the present disclosure are intended to be limited in these respects.

In an embodiment, the attachment system 100 can be part of a disposable apparatus for providing light to a remote location, such that the apparatus can be discarded after one use rather than cleaned, sterilized and reused. The disposable apparatus may be discarded after a single procedure or after use with a single patient. It may be desirable to provide or manufacture the disposable apparatus so that it is not harmful to the environment. For example, the disposable apparatus may be made of a recyclable composition. The disposable apparatus may also or alternatively be made of a biodegradable composition, or a composition that is otherwise easily broken down by mechanical energy, heat energy, or any other recycling technique. The disposable apparatus may also be made of a composition that is free from toxic chemicals, environmental pollutants, or other harmful materials.

The disposable apparatus can include a light emitter (for example, a light-emitting diode (LED)), a power source providing energy to the light emitter, the light pipe, and the attachment system 100 for transporting light energy from the light emitter to the attachment system 100. In an embodiment, the light emitter may emit light energy having a wavelength between about 400 nanometers and about 470 nanometers. In an embodiment, the light emitter may emit light energy having a wavelength between about 430 nanometers and about 440 nanometers. In an embodiment, power for the light emitter and other parts of the attachment system 100 may be provided by a power source, such as a battery and/or a power cord. An on/off switch may control the flow of power to the light emitter and timers and/or pulse buttons may be included to allow a user to precondition the application of light.

The attachment system 100 of the present disclosure can be used during various surgical procedures, including, but not limited to, heating, burning, ablating and/or destroying tissue, organs, vessels or other structures; curing materials; a procedure for repairing a fractured bone; a procedure for fixing tendons and ligaments to bone; a procedure for repairing vertebral disc height; a spinal fusion procedure; and a procedure for placing an interior spine process spacer, wherein each of the procedures utilizes a light-conducting fiber to deliver light energy. In an embodiment, the light-conducting fiber transmits light energy to cure a light-sensitive liquid in an expandable portion. In such procedures, a proximal end of the light-conducting fiber engages the light-conducting fiber body of the attachment system. Radiant energy from a light source is transmitted to the light-conducting fiber via the attachment system. The radiant energy from the light source is absorbed and converted into chemical energy to cure the light-sensitive liquid, thus creating an expandable portion having reinforcing material The attachment system is sufficiently designed to maintain the light transmitting properties of the light-conducting fiber.

An attachment system includes a light pipe body sufficiently designed to engage a distal end of a light pipe, the light pipe body comprising at least one opening configured to dissipate heat buildup from light energy; a front assembly sufficiently designed to engage the light pipe body, the front assembly comprising an orifice and at least one opening configured to dissipate heat buildup from light energy; a light-conducting fiber body sufficiently designed to engage the front assembly and to hold a proximal portion of a light-conducting fiber, the light-conducting fiber body positioned in the orifice of the front assembly; and an optical taper assembly sufficiently designed to hold an optical taper, the optical taper assembly positioned between and spaced apart from the front assembly, and positioned between and spaced apart from the light pipe.

A device for transmitting light energy to a remote location includes a first portion having a cavity for carrying a light pipe, the light pipe transmitting light energy from a light source; an optical taper assembly having an optical taper sufficiently designed to alter at least one property of the light energy; and a second portion having a cavity for carrying an optical fiber, the optical fiber receiving the altered light energy from the optical taper; wherein the optical taper is configured to be spaced apart from a distal end of the light pipe, and wherein the optical taper is configured to be spaced apart from a proximal end of the optical fiber, when the light pipe and the optical fiber are positioned in the device.

A method of transmitting light energy to a remote location includes providing a light source having a light pipe; providing an attachment system comprising: a light pipe body sufficiently designed to engage a distal end of the light pipe, the light pipe body comprising at least one opening configured to dissipate heat buildup from the light energy; a front assembly sufficiently designed to engage the light pipe body, the front assembly comprising an orifice and at least one opening configured to dissipate heat buildup from the light energy; a light-conducting fiber body sufficiently designed to engage the front assembly and to hold a proximal portion of a light-conducting fiber, the light-conducting fiber body positioned in the orifice of the front assembly; and an optical taper assembly sufficiently designed to hold an optical taper, the optical taper assembly positioned between and spaced apart from the front assembly, and positioned between and spaced apart from the light pipe; engaging the light pipe to the light pipe body; engaging the light-conducting fiber to the light-conducting fiber body; activating a power source to energize the light source to produce the light energy; and transmitting the light energy from the light source through the attachment system to the remote location.

All patents, patent applications, and published references cited herein are hereby incorporated by reference in their entirety. It will be appreciated that several of the above-disclosed and other features and functions, or alternatives thereof, may be desirably combined into many other different systems or application. Various presently unforeseen or unanticipated alternatives, modifications, variations, or improvements therein may be subsequently made by those skilled in the art.

What is claimed is:

1. An attachment system comprising:
   a light pipe body sufficiently designed to engage a distal end of a light pipe, the light pipe body comprising at least one opening configured to dissipate heat buildup from light energy;
   a front assembly sufficiently designed to engage the light pipe body, the front assembly comprising an orifice and at least one opening configured to dissipate heat buildup from light energy;
   a light-conducting fiber body sufficiently designed to engage the front assembly and to hold a proximal portion of a light-conducting fiber, the light-conducting fiber body positioned in the orifice of the front assembly; and
   an optical taper assembly sufficiently designed to hold an optical taper, the optical taper assembly positioned between and spaced apart from the front assembly, and positioned between and spaced apart from the light pipe.

2. The system of claim 1 wherein the light pipe transmits light energy from a light source.

3. The system of claim 2 wherein the light source comprises light-emitting diodes emitting light with a wavelength between about 400 nanometers and about 470 nanometers.

4. The system of claim 1 wherein the front assembly is made from an aluminum material.

5. The system of claim 1 wherein the openings are one of a hole, a space, a cavity or a vent.

6. The system of claim 1 wherein the openings are pathways to prevent a buildup of at least one of heat, temperature, energy, pressure, or gas.

7. The system of claim 1 wherein the light-conducting fiber body is made from a polyphenylsulfone material.

8. The system of claim 1 wherein the light-conducting fiber body is made from an aluminum metal.

9. The system of claim 1 wherein the light-conducting fiber is a plastic optical fiber.

10. The system of claim 1 wherein the space between the optical taper assembly and the light pipe, and the opening in the light pipe body, are configured to eliminate pressure buildup and dissipate heat, and wherein the space between the optical taper assembly and the front assembly, and the opening in the front assembly, are configured to eliminate pressure buildup and dissipate heat.

11. The system of claim 1 wherein the optical taper assembly includes a reflective polished surface designed to reflect light back towards a light source.

12. The system of claim 11 wherein the reflective polished surface is chosen from a group consisting of a mirror, metal, glass, mylars, and other material capable of reflecting light towards the light source.

13. A device comprising:
    a first portion having a cavity for carrying a light pipe, the light pipe transmitting light energy from a light source;
    an optical taper assembly having an optical taper sufficiently designed to alter at least one property of the light energy; and
    a second portion having a cavity for carrying an optical fiber, the optical fiber receiving the altered light energy from the optical taper;
    wherein the optical taper is configured to be spaced apart from a distal end of the light pipe, and wherein the optical taper is configured to be spaced apart from a proximal end of the optical fiber, when the light pipe and the optical fiber are positioned in the device.

14. The device of claim 13 wherein the device is supplied for a single-use.

15. The device of claim 13 wherein the light source comprises light-emitting diodes emitting light with a wavelength between about 400 nanometers and about 470 nanometers.

16. The device of claim 13 wherein the optical taper includes a reflective polished surface designed to reflect light towards the light source.

17. The device of claim 13 wherein the second portion comprises two components that are each fabricated from a different material.

18. The device of claim 17 wherein a first component of the second portion is fabricated from an aluminum material and a second component of the second portion is fabricated from a polyphenylsulfone material.

19. A method of transmitting light energy to a remote location comprising:
    providing a light source having a light pipe;
    providing an attachment system comprising:
        a light pipe body sufficiently designed to engage a distal end of the light pipe, the light pipe body comprising at least one opening configured to dissipate heat buildup from the light energy;
        a front assembly sufficiently designed to engage the light pipe body, the front assembly comprising an orifice and at least one opening configured to dissipate heat buildup from the light energy;
        a light-conducting fiber body sufficiently designed to engage the front assembly and to hold a proximal portion of a light-conducting fiber, the light-conducting fiber body positioned in the orifice of the front assembly; and an optical taper assembly sufficiently designed to hold an optical taper, the optical taper assembly positioned between and spaced apart from the front assembly, and positioned between and spaced apart from the light pipe;

engaging the light pipe to the light pipe body;

engaging the light-conducting fiber to the light-conducting fiber body;

activating a power source to energize the light source to produce the light energy; and transmitting the light energy from the light source through the attachment system to the remote location.

20. The method of claim 19 further comprising programming the light source to emit a predetermined amount of energy.

* * * * *